United States Patent [19]

Murase et al.

[11] Patent Number: 4,868,284

[45] Date of Patent: Sep. 19, 1989

[54] PROCESS FOR PRODUCING STRETCHED MOLDED ARTICLES OF CONJUGATED POLYMERS AND HIGHLY CONDUCTIVE COMPOSITIONS OF SAID POLYMERS

[75] Inventors: Ichiki Murase, Otsu; Toshihiro Ohnishi, Itami; Takanobu Noguchi, Otsu, all of Japan

[73] Assignee: Director-General of the Agency of Industrial Science and Technology, Tokyo, Japan

[21] Appl. No.: 95,825

[22] Filed: Sep. 10, 1987

[30] Foreign Application Priority Data

| Sep. 18, 1986 | [JP] | Japan | 61-217970 |
| Sep. 18, 1986 | [JP] | Japan | 61-217971 |
| Dec. 25, 1986 | [JP] | Japan | 61-307859 |
| Dec. 25, 1986 | [JP] | Japan | 61-307860 |
| Dec. 25, 1986 | [JP] | Japan | 61-307864 |
| Dec. 25, 1986 | [JP] | Japan | 61-307865 |

[51] Int. Cl.$^4$ .......................... C08F 6/00; H01B 1/06
[52] U.S. Cl. .................................. 528/481; 528/502; 252/500; 252/512; 252/518
[58] Field of Search ............... 252/500, 512, 518; 524/401; 528/481, 396, 502, 391, 487, 481, 490, 491, 492, 502, 588

[56] References Cited

U.S. PATENT DOCUMENTS

| 4,528,118 | 7/1985 | Murase et al. | 252/500 |
| 4,626,588 | 12/1986 | Murase et al. | 528/481 |

FOREIGN PATENT DOCUMENTS 0182548  5/1986  European Pat. Off. .

Primary Examiner—Josephine Barr
Attorney, Agent, or Firm—Stevens, Davis, Miller & Mosher

[57] ABSTRACT

A process for producing a stretched molded article of a conjugated polymer, which comprises subjecting a polymer precursor having a repeating unit represented by the general formula (I)

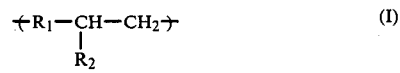

(wherein $R_1$ is a group which forms a C—C conjugated system together with a vinylene group which is formed upon the dehydrogenation of the $>$CH—CH$_2$— group; and $R_2$ is a group which is to be eliminated from the alpha-position carbon of the $>$CH—CH$_2$— group simultaneously with the elimination of one of the hydrogen atoms bonding to the beta-position carbon of the $>$CH—CH$_2$— group) to stretching in the swelling state and then subjecting the stretched precursor polymer to elimination of the $R_2$ group, and a conductive composition of the stretched molded article of the conjugated polymer, comprising the conjugated polymer and a dopant as essential components.

3 Claims, No Drawings

PROCESS FOR PRODUCING STRETCHED MOLDED ARTICLES OF CONJUGATED POLYMERS AND HIGHLY CONDUCTIVE COMPOSITIONS OF SAID POLYMERS

BACKGROUND OF THE INVENTION

1. Field of the Invention

The present invention relates to a process for producing stretched articles of conjugated polymers and highly conductive compositions of said stretched article and a dopant. These compositions are useful as a conductive polymer material.

2. Description of the Prior Art

It is known that stretched molded articles of conjugated polymers can be obtained by a process of thermally stretching a conjugated polymer or by a process of thermally decomposing a precursor polymer to obtain a conjugated polymer and simultaneously thermally stretching the precursor polymer. It is further known that compositions between said molded article of a conjugated polymer and a dopant can also be obtained. With respect to the latter stretching process, in particular, stretched molded articles of conjugated polymers having a high stretch ratio as well as their compositions with a dopant are reported. In this connection, a stretched poly(p-phenylene vinylene) film obtained by subjecting a film of a soluble precursor polymer prepared via sulfonium salt route to thermal decomposition and thermal stretching, as well as its composition with a dopant are known. For example, a stretched film of poly(p-phenylene vinylene) obtained by subjecting a p-xylylenedimethylene-bis(sulfonium salt) to condensation polymerization, subjecting the resulting polymer to cast molding, subsequently to elimination of the sulfonium salt group, and then to thermal stretching is known to have, when made into a composition with a dopant (arsenic pentafluoride), a conductivity of 2,790 S/cm (U.S. Pat. No. 4,528,118).

However, conjugated polymers, being rigid, insoluble and infusible, give stretched molded articles of low stretch ratio when merely subjected to thermal stretching. Molded articles of high stretch ratio can be obtained by producing a precursor film from a soluble precursor polymer and subjecting the film to thermal decomposition and thermal stretching; however, rigid conjugated polymers are also formed during stretching and accordingly the molded articles have a limit in stretch ratio. Further, conductive compositions produced therefrom have a maximum conductivity of 2,790 S/cm, which is not sufficiently high in practical application.

SUMMARY OF THE INVENTION

The present inventors found that stretched molded articles of conjugated polymers having a high stretch ratio, of which production had been substantially difficult according to the conventional process mentioned above, can be obtained by stretching a precursor polymer in a swelling state and a subsequent heat treatment and that their compositions with a dopant have a far higher conductivity than the conventional compositions.

An object of the present invention is to provide a process for producing a stretched molded article of a conjugated polymer, which comprises subjecting a precursor polymer having a repeating unit represented by the general formula (I)

$$\mathrm{-(R_1-CH-CH_2)-} \atop {\phantom{xxxxx}|\phantom{xxx}} \atop {\phantom{xxxx}R_2\phantom{xxx}} \qquad (I)$$

(wherein $R_1$ is a group which forms a C—C conjugated system together with a vinylene group which is formed upon the dehydrogenation of the >CH—CH$_2$— group; and $R_2$ is a group which is to be eliminated from the alpha-position carbon of the >CH—CH$_2$— group simultaneously with the elimination of one of the hydrogen atoms bonding to the beta-position carbon of the >CH—CH$_2$— group) to a stretching treatment in the swelling state and then subjecting the stretched precursor polymer to a treatment for elimination of the $R_2$ group.

Another object of the present invention is to provide a highly conductive composition comprising, as essential components, said stretched conjugated polymer and a dopant.

Other objects will become apparent from the following description of the specification.

DETAILED DESCRIPTION OF THE INVENTION

The present invention will be described in detail below.

Precursor polymers used in the present invention are obtained by subjecting a disulfonium salt represented by the general formula (II)

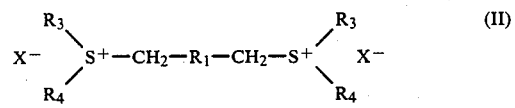

(wherein $R_1$ is a group which forms a C—C conjugated system together with a vinylene group which is formed upon the hydrogenation of the >CH—CH$_2$— group, $R_3$ and $R_4$ are each a hydrocarbon group of 1 to 10 carbon atoms, and $X^-$ is a counter ion) to condensation polymerization with an alkali.

$R_1$ in the general formulae (I) and (II) is selected from the group consisting of aromatic hydrocarbon groups having 6 to 14 carbon atoms, nuclear substituted compounds thereof, heterocyclic aromatic compounds having 4 to 13 carbon atoms, nuclear substituted compounds thereof, etc. The substituents in $R_1$ have no particular restriction but preferably are hydrocarbon groups of 1 to 10 carbon atoms, alkoxy groups of 1 to 10 carbon atoms and halogen groups. Specific examples of the $R_1$ group include p-phenylene, 2,5-dimethoxy-p-phenylene, 2,5-diethoxy-p-phenylene, 2,5-dimethyl-p-phenylene, 2,5-dichloro-p-phenylene, 2,5-dibromo-p-phenylene, 2,6-naphthalenediyl, 2,5-thienylene, 3-methyl-2,5-thienylene, 3-methoxy-2,5-thienylene and 2,5-furandiyl.

$R_2$ in the general formula (I) is

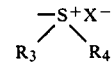

as a side chain of a polymeric sulfonium salt obtained by the condensation of the disulfonium salt monomer of the general formula (II), or —OR$_5$ (wherein R$_5$ is an alkyl group of 1 to 10 carbon atoms or a hydrogen atom) obtained from the reaction of said side chain with a hydroxyl or alkoxy group of the water or alcohol solvent, respectively, used in the polymerization.

As the monomer represented by the general formula (II) used in the present invention, for example, there can be used those obtained by reacting XCH$_2$—R$_1$—CH$_2$X (wherein X is a halogen atom) with a sulfide having a hydrocarbon group having 1 to 10 carbon atoms. As the hydrocarbon group of the sulfide, there can be used, for example, methyl, ethyl, propyl, isopropyl, n-butyl, 2-ethylhexyl, dodecyl, octadecyl, phenyl, cyclohexyl and benzyl. Of these, hydrocarbon groups of 1 to 6 carbon atoms, particularly, methyl and ethyl are preferred.

As the counter ion X$^-$ of the sulfonium salt, there can be used any counter ion according to an ordinary method. For example, there can be used halogen, hydroxyl, boron tetrafluoride, perchloric acid, carboxylic acid and sulfonic acid ions. Of these, halogen (e.g. chlorine, bromine, iodine) and hydroxyl ions are preferred.

The precursor polymer can be obtained by subjecting a disulfonium salt represented by the general formula (II) to condensation polymerization using an alkali in a solvent.

As the solvent used in the condensation polymerization, there can be used water, a mixed solvent containing water and a water-soluble organic solvent (e.g. an alcohol). Of these, water or a mixed solvent of water and an alcohol is preferred because it can increase the solubility of the alkali therein.

The alkali solution used in the condensation polymerization is preferred to be a strongly basic solution of pH 11 or higher. As the alkali, there can be used sodium hydroxide, potassium hydroxide, calcium hydroxide, a quaternary ammonium hydroxide, a sulfonium hydroxide, a strongly basic ion exchange resin of OH type, etc. Of these, sodium hydroxide, potassium hydroxide and the strongly basic ion exchange resin are preferred.

The temperature of the condensation polymerization reaction is preferred to be relatively low, i.e. 50° C. or below, particularly 25° C. or below, more particularly 5° C. or below because the sulfonium salt group is sensitive to heat, visible light, ultraviolet rays, strong bases and tends to cause, after polymerization, slow separation from the formed polymer due to these factors. The time of the reaction has no particular restriction and can be selected appropriately depending upon the reaction temperature employed. However, it is usually between 1 minute and 50 hours.

When R$_1$ in the general formula (I) is 2,5-thienylene or a nuclear substituted compound thereof, a precursor polymer for a 2,5-thienylene vinylene polymer is formed as a high-molecular electrolyte (a sulfonium salt polymer) having a sulfonium salt (i.e.

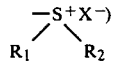

as its side chain; then, the precursor polymer is reacted with an alcohol (R$_5$OH) used as a component of a solvent used, to substitute an alkoxy group (R$_5$O—) [this corresponds to the R$_2$ group of the general formula (I)] for the side chain.

Hence, it is requisite that the solvent used in the above reaction contains an alcohol represented by R$_5$OH. This alcohol can be used singly or as a mixture with other solvent. The other solvent has no particular restriction as long as it is soluble in the alcohol; however, water is particularly preferred. The other solvent content in the mixed solvent has no particular restriction, either, as long as the mixed solvent contains the alcohol; but the content is preferably at least 5% by weight.

As the R$_5$, there can be mentioned hydrocarbon groups of 1 to 10 carbon atoms such as methyl, ethyl, propyl, isopropyl, n-butyl, 2-ethylhexyl, phenyl, cyclohexyl and the like. Of these, hydrocarbon groups of 1 to 6 carbon atoms, particularly methyl and ethyl groups are preferred.

The substitution reaction of alkoxy group for sulfonium salt side chain becomes more effective by conducting it at a temperature higher than the one used in the formation of the precursor polymer.

When the solvent used in the formation of the precursor polymer contains an alcohol or water necessary for the substitution reaction of alkoxy group or hydroxy group for sulfonium salt side chain, respectively, the substitution reaction can be conducted subsequently to the formation of the precursor polymer. Meanwhile, when the solvent is, for example, water and contains no alcohol, an alcohol must be added to initiate the substitution reaction for the alkoxy group.

The temperature used in the substitution reaction is preferably 0° to 50° C., more preferably 0° to 25° C. in view of the reaction speed. In general, polymers having an alkoxy group as the side chain are insoluble in the mixed solvent used in their formation and accordingly precipitate with the progress of the polymerization reaction. Hence, it is effective to conduct the reaction until the precipitation of formed polymer is completed; therefore, the reaction time, is, for example, preferably at least 15 minutes, more preferably at least one hour.

The precursor polymer having an alkoxy group as its side chain can be separated by filtering the precipitate formed above.

The precursor polymer represented by the general formula (I) in order to allow it to have a high conductivity, is desired to have a sufficiently large molecular weight. Therefore, a precursor polymer having a structure of at least two repeating units, preferably 5 to 50,000 repeating units, for example, a precursor polymer having such a large molecular weight as the polymer can not be dialyzed through a dialysis membrane having a molecular cut off level of 3,500 are effectively used.

According to the process of the present invention, the precursor polymer of the general formula (I) is stretched in the swelling state with the side chain R$_2$ group remaining and is then subjected to elimination of R$_2$, whereby a conjugated polymer can be obtained. Co-use of further stretching at the time of the elimination of R$_2$ is more effective.

In the present invention, stretching of a molded article of a precursor polymer in the swelling state is important. The swelling state used herein refers to a state of the molded article in which it contains at least 3% by weight, based on the dry weight, of a solvent and the shape can be retained even under stretching.

The solvent used for stretching in the swelling state has no particular restriction and can be a single solvent or a mixed solvent as long as it can swell the precursor polymer. However, in view of the operability of stretching, the solvent is preferred to be a mixed solvent of at least one good solvent and at least one poor solvent for the precursor polymer. The mixing ratio of the two types of the solvents has no particular restriction but practically differs by the types of the solvents and the structure of the precursor polymer used; therefore, the mixing ratio is appropriately determined in view of these factors. When the $R_2$ group of the general formula (I) has a structure of sulfonium salt, the good solvent is water and alcohols and the poor solvent is other organic solvents having a high dielectric constant. Specific examples of the good solvent are water, methyl alcohol, ethyl alcohol and butyl alcohol. Specific examples of the poor solvent are organic solvents soluble in the good solvent used together, such as acetone, dimethylacetamide, dimethylformamide, dimethyl sulfoxide and N-methylpyrrolidone. When the $R_2$ group of the general formula (I) is an alkoxy or hydroxyl group, there can be mentioned, as the good solvent, dimethylacetamide, dimethylformamide, tetrahydrofuran, dioxane, etc. and, as the poor solvent, water, alcohols, acetone, acetonitrile, etc.

The method of stretching in the swelling state has no particular restriction. However, it is preferred that the precursor polymer is sufficiently swelled by a solvent and then stretched uniaxially or biaxially.

The temperature of stretching in the swelling state has no particular restriction. However, temperatures at which no substantial elimination of the $R_2$ group takes place are sufficient because too high a temperature causes the elimination of the $R_2$ group and accordingly is ineffective and too low a temperature causes the freezing of the solvent. Ordinarily 0° to 100° C., preferably 0° to 80° C. is used.

The present invention is characterized in that a molded article of a precursor polymer is stretched with its molecular structure being retained and then subjected to a heat treatment to obtain a conjugated polymer.

The precursor polymer can be made into a molded article of any desired shape from its solution. Any desired method can be used in producing a stretched precursor polymer molded article. The molded article can have any desired shape such as a film, a fiber, and a membrane coated on a stretchable substrate. Such a precursor polymer used in production of a precursor polymer molded article is preferred to be subjected to a preliminary treatment such as dialysis, precipitation or the like and, as a result, to contain no low-molecular polymer or no unreacted raw material.

After stretching, the precursor polymer is subjected to a treatment for elimination of the $R_2$ group in the formula (I) (e.g. sulfonium, alkoxy group).

This elimination treatment can be effected using a means such as heat, visible light, ultraviolet rays or the like. An elimination treatment by heat is preferred. It is also preferred that the elimination treatment for the precursor polymer is effected in an inert atmosphere. The inert atmosphere refers herein to an inert gas such as nitrogen, argon, helium or the like. The elimination treatment may also be effected under vacuum or in an inert medium.

In the elimination treatment by heat, the appropriate treatment temperature is ordinarily 0° to 450° C., preferably 50° to 400° C., because the treatment at too high a temperature causes the decomposition of the conjugated polymer formed and the treatment at too low a temperature makes the elimination reaction slow and impractical. The treatment time can be determined appropriately depending upon the treatment temperature used, but 1 minute to 10 hours is practical for industrial use.

The thus produced conjugated polymer contains a $-R_1-CH=CH-$ [hereinafter referred to as "(X)"] repeating unit as its major constituent unit. According to the production process of the present invention, it is possible to produce a conjugated polymer containing only (X) repeating unit, but it is also possible to produce a conjugated polymer containing, in addition to said repeating unit, a minor amount of a non-conjugated

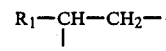

[hereinafter referred to as "(Y)"] unit. Examination by infrared absorption spectrum or the like reveals that the conjugated polymer obtained from an insufficient elimination treatment contains, besides the (X) unit, the (Y) unit formed as a result of incomplete elimination. Such a conjugated polymer has high flexibility. The proportion of (Y) unit to (X) unit can be varied so as to best meet the application purpose of the conjugated polymer, by appropriately selecting the production conditions of the polymer.

The conjugated polymer which is used for the production of a highly conductive composition of the present invention is not required to contain only a conjugated (X) repeating unit. The present inventors unexpectedly have found a fact that even a conjugated polymer containing, besides the (X) unit, the (Y) unit formed as a result of incomplete elimination can be endowed with a high conductivity by doping. Such a conjugated polymer has an advantage of being capable of providing a conductive composition of high flexibility.

In order to obtain a highly conductive composition of the present invention, the proportion of (Y) unit in conjugated polymer is preferably 1 or below, more preferably 1/20 or below per 1 unit of (X).

A higher orientation can be obtained by subjecting the molded article of the precursor polymer stretched in the swelling state to stretching and heat treatment.

The stretched conjugated polymer molded article obtained from the elimination treatment of a precursor polymer stretched in the swelling state is then doped with an electron acceptor or donor (hereinafter referred to as a dopant), whereby a highly conductive composition can be produced.

As the dopant, there may be effectively used those compounds which have been found to be effective in improving the conductivity in doping well-known electroconductive polymers such as polyacetylene and in forming an intercalated compound of graphite.

The composition of the present invention can be produced using any doping method. However, doping methods such as chemical doping, electrochemical doping, photodoping, ion implantation and the like are preferred.

Specific examples of the electron acceptor include the followings.

Halogen compounds: Fluorine, chlorine, bromine, iodine, iodine chloride, iodine trichloride, iodine bromide Lewis acids: Phosphorus pentafluoride, arsenic pentafluoride, antimony pentafluoride, boron trifluoride, boron trichloride, boron tribromide, sulfur trioxide Protonic acids: Hydrogen fluoride, hydrogen chloride, nitric acid, sulfuric acid, perchloric acid, fluorosulfonic acids, chlorosulfonic acids, trifluoromethanesulfonic acid Transition metal chlorides: Titanium tetrachloride, zirconium tetrachloride, hafnium tetrachloride, niobium pentachloride, tantalum pentachloride, molybdenum pentachloride, tungsten hexachloride, iron trichloride Organic compounds: Tetracyanoethylene, tetracyanoquinodimethane, chloranil, dichlorodicyanobenzoquinone Specific examples of the electron donor include the followings.

Alkali metals: Lithium, sodium, potassium, rubidium, cesium

Quaternary ammonium salts: Tetraalkylammonium ion

The content of dopant in the composition of the present invention is determined by the type of dopant used. However, it can generally be altered as desired, depending upon the doping conditions (e.g. doping time, dopant concentration). A preferable content of dopant is ordinarily 0.01 to 2.0 moles per one repeating unit of conjugated polymer. When the mole number is too small, the high conductivity of composition is not attained. When the mole number is too large, the conductivity of composition tends to saturate and accordingly too large a mole number is uneconomical. Of the dopants mentioned previously, those which do not interfere with the conjugated double bonds and $R_1$ group in the formula (I) are preferred because they can provide a highly conductive composition. Sulfur trioxide, sulfuric acid and iodine are particularly effective dopants. The composition, when it is a highly oriented molded article, shows a conductivity as high as 6,500 S/cm. The uniaxially stretched composition of such a high conductivity shows an electrical anisotropy and the anisotropy between the direction of stretching and the direction perpendicular thereto can reach at least five times.

In order to obtain a composition of high conductivity, it is highly preferred that both the elimination treatment of precursor polymer and the doping of conjugated polymer is effected in an inert atmosphere.

The stretched molded articles of the conjugated polymer of the present invention produced via stretching in a swelling state, when compared with stretched molded articles produced by mere thermal stretching, has a far higher stretch ratio and a different molecular chain orientation. Said molded articles are considered to have a highly ordered structure which is very suitable to exhibit a high conductivity.

As stated above, the present invention can provide molded articles of conjugated polymer having far higher stretch ratio than those obtained by conventional stretching as well as their compositions with a dopant. Because of their excellent conductivity, they can be used in various applications as an electrical or electronic material.

EXAMPLE 1

4.4 g of p-xylylene-bis(diethylsulfonium bromide) was dissolved in 50 ml of distilled water. Thereto was dropwise added in 15 minutes a solution of 0.8 g of sodium hydroxide dissolved in 50 ml of distilled water. The mixture was stirred for 3 hours at 0° to 5° C. After the reaction, neutralization was conducted with a 0.66N aqueous hydrogen bromide solution. The resulting aqueous solution of a precursor polymer having a sulfonium salt as its side chain was subjected to dialysis against water for 1 day using a dialysis membrane (Cellotube ®, fractionation molecular weight 8,000, a product of Union Carbide Co.). The dialyzate was dried under reduced pressure to obtain a cast film having a thickness of 50 micrometers. This precursor polymer film was cut into squares each of 3 cm×3 cm and immersed in an acetone-water mixed solvent (85:15 by weight). The film in the solvent had a solvent content of 35% by weight. The film, while being immersed in the solvent, was slowly stretched to 18 times its length before immersion and was freed of the acetone-water mixed solvent. Then, the film was dried in a nitrogen stream. The resulting film was subjected simultaneously to heat treatment and stretching to 1.2 times, at 100° to 400° C. in a nitrogen atmosphere in a horizontal tubular furnace to obtain an orange poly(p-phenylene vinylene) film uniaxially stretched to 22 times. The film had a thickness of 20 micrometers. The presence of diethyl sulfide (mass number 90) in the gas generated during the heat treatment was detected by a mass spectrometer (MSQ-300, a product of ULVAC Corporation), which confirmed the presence of sulfonium salt side chain in the film after stretching in a swelling state.

The film thus obtained was doped in sulfuric acid as an electron acceptor. The film taken out of sulfuric acid had a black color and showed a conductivity of 6,500 S/cm. The measurement of conductivity was carried out by the four-probe technique.

COMPARATIVE EXAMPLE 1

The precursor polymer film obtained in Example 1 was subjected simultaneously to a thermal treatment and stretching to 6 times, at 100° to 400° C. in a nitrogen atmosphere in a horizontal tubular furnace to obtain a uniaxially stretched poly(p-phenylene vinylene) film having an orange color. The film had a thickness of 18 micrometers.

The film was doped in sulfuric acid. The film taken out of sulfuric acid had a black color and showed a conductivity of 1,300 S/cm.

EXAMPLE 2

4.4 g of p-xylylene-bis(diethylsulfonium bromide) was dissolved in 50 ml of deionized water, and the solution was cooled to 3° C. Thereto was added slowly in 10 minutes a strongly basic ion exchange resin (Amberlite ® IRA-401, a product of Rohm and Haas Co.) which had been converted to the OH-form, in an amount of 4 equivalents per 1 equivalent of p-xylylene-bis(diethylsulfonium bromide) used. The mixture was stirred for 3 hours at 0° to 5° C. After the reaction, the filtrate was subjected to dialysis against water for 2 days at room temperature using a dialysis membrane (Cellotube ®, fractionation molecular weight 3,500, a product of for 24 hours at 30° C. under reduced pressure to obtain a cast film having a thickness of 50 micrometers. This precursor polymer film was cut into squares each of 3 cm×3 cm and immersed in an acetone-water mixed solvent containing 10% by weight of water. The film immersed in the solvent had a solvent content of 25% by weight. The film, while being immersed in the solvent, was slowly stretched to 12.6 times its length before immersion. The stretched film was freed of the acetone-water mixed solvent and dried in a nitrogen stream. The resulting film was subjected simultaneously to a thermal treatment and stretching to 1.4 times, at 100° to 400° C. in a nitrogen atmosphere in a horizontal tubular furnace to obtain an orange poly(p-phenylene vinylene) film uniaxially stretched to 17.6 times. The film had a thickness of 18 micrometers.

The film was doped in a sulfuric acid. The film taken out of sulfuric acid had a black color and showed a conductivity of 4,500 S/cm.

EXAMPLE 3

The aqueous solution of precursor polymer obtained in Example 1 was concentrated to ½ at 50° C. under reduced pressure. The concentrate was slowly extruded and spun into acetone from a nozzle having a diameter of 2 mm. The filament was dried under reduced pressure and then immersed in an acetone-water mixed solvent containing 10% by weight of water and slowly stretched to 6 times the length before immersion. The stretched filament was freed of the acetone-water mixed solvent and dried in a nitrogen stream. The resulting filament was subjected simultaneously to heat treatment and stretching to 3 times, at 100° to 400° C. in a nitrogen atmosphere in a horizontal tubular furnace to obtain an orange poly(p-phenylene vinylene) filament uniaxially stretched to 18 times.

The stretched filament was doped in sulfuric acid. The filament had a black color and showed a conductivity of 2,300 S/cm.

EXAMPLE 4

4.7 g of 2,5-dimethyl-p-xylylene-bis(diethylsulfonium bromide) was dissolved in 50 ml of distilled water. The solution was cooled to 3° C. Thereto was dropwise added a solution of 0.8 g of sodium hydroxide dissolved in 50 ml of distilled water, cooled to 3° C. The mixture was stirred for 2 hours at 0° to 5° C. After the reaction, neutralization was conducted with a 0.6N hydrogen bromide solution. The resulting aqueous solution of a precursor polymer having a side chain of the sulfonium salt was subjected to dialysis against water for 1 day using a dialysis membrane (Cellotube ®, fractionation molecular weight 20,000, a product of Union Carbide Co.). The dialyzate was dried for 24 hours at 30° C. under reduced pressure to obtain a cast film having a thickness of 32 micrometers. This precursor polymer film was cut into squares each of 2 cm×2 cm. The squares were immersed in an acetone-water mixed solvent (80:20 by weight) and slowly stretched to 5 times the length before immersion. The stretched film was freed of the acetone-water mixed solvent and dried in a nitrogen stream. The dried film was subjected simultaneously to heat treatment and stretching to 2.2 times, at 100° to 350° C. in a nitrogen atmosphere in a horizontal tubular furnace to obtain an orange-yellow poly(2,5-dimethyl-p-phenylene vinylene) film uniaxially stretched to 11 times. This film had a thickness of about 10 micrometers.

The thus obtained film was subjected to gas phase doping according to an ordinary method, using sulfuric anhydride as an electron acceptor. The film had a black color and showed a conductivity of $9.2 \times 10^{-2}$ S/cm.

EXAMPLE 5

3.6 g of 2,5-dimethoxy-p-xylylene-bis(dimethylsulfonium bromide) was dissolved in 50 ml of deionized water. Thereto was dropwise added 50 ml of a 0.3N aqueous NaOH solution at 0° to 5° C. in 15 minutes. The mixture was stirred for 30 minutes at 0° to 5° C. After the reaction, neutralization was conducted with a 0.77N aqueous HBr solution. Further, the 0.77 HBr solution was added in an amount of 1 equivalent per 1 equivalent of the NaOH added. The reaction mixture was subjected to dialysis for 1 day using a dialysis membrane (Cellotube ®, fractionation molecular weight 8,000, a product of Union Carbide Co.).

The dialyzate was cast and dried at a temperature of 40° C. or below under reduced pressure to obtain a light red film of a precursor polymer having a side chain of the sulfonium salt, having a thickness of 20 micrometers. This precursor polymer film was cut into squares each of 3 cm×3 cm and immersed in an acetone-water mixed solution containing 10% by weight of water and slowly stretched to 4 times the length before immersion. The stretched film was freed of the acetone-water mixed solvent and dried in a nitrogen stream. The resulting film was subjected simultaneously to heat treatment and stretching to 1.5 times at 100° to 300° C. in a nitrogen atmosphere in a horizontal tubular furnace to obtain a red poly(2,5-dimethoxy-p-phenylene vinylene) film uniaxially stretched to 6 times. The film had a thickness of about 8 micrometers.

This film was subjected to gas phase doping at room temperature according to an ordinary method using iodine which is an electron-accepting compound. The film showed a conductivity of 254 S/cm in 8 hours.

EXAMPLE 6

1.5 g of 2,5-diethoxy-p-xylylene-bis(diethylsulfonium bromide) was dissolved in 50 ml of a distilled water-ethanol mixed solvent (1:2 by weight). The solution was cooled to 0° C. Thereto was slowly added in 10 minutes a strongly basic ion exchange resin (Amberlite ® IRA-401, a product of Rohm and Haas Co.) which had been converted to the OH-form, in an amount of 2 equivalents based on 1 equivalent of the sulfonium salt monomer. The mixture was stirred for 100 minutes at 0° to 5° C.

After the reaction, filtration was conducted to remove the ion exchange resin. The filtrate was subjected to dialysis for 1 day at 0° to 5° C. using a dialysis membrane (Cellotube ®, fractionation molecular weight 10,000 to 20,000).

The dialyzate was cast and dried at 40° C. or below under reduced pressure to obtain a light red film of a precursor polymer having a side chain of the sulfonium salt, of 18 micrometers in thickness. This precursor polymer film was cut into squares each of 3 cm×3 cm and immersed in an acetone-water mixed solvent containing 12% by weight of water and slowly stretched to 3.2 times the length before immersion. The stretched film was freed of the acetone-water mixed solvent and dried in a nitrogen stream. This film was subjected simultaneously to heat treatment and stretching to 1.7 times, at 100° to 300° C. in a nitrogen atmosphere in a horizontal tubular furnace to obtain a red poly(2,5-diethoxy-p-phenylene vinylene) film uniaxially stretched to 5.4 times. It had a thickness of about 7 micrometers.

The film was subjected to gas phase doping at room temperature according to an ordinary method using iodine as an electron acceptor. The film showed a conductivity of 288 S/cm in 12 hours.

EXAMPLE 7

7.6 g of 2.5-furandiyl-bis(methylenedimethylsulfonium bromide) was dissolved in 200 ml of a deionized water-methanol mixed solvent (1:1 by volume). Thereto was dropwise added a mixed solution consisting of 20 ml of 1 N NaOH and 80 ml of methanol, at −30° C. in 30 minutes. The mixture was stirred for 30 minutes at −30° C.

The reaction mixture was subjected to dialysis against a water-methanol mixed solvent (1:1) at −30° C. for 1 day using a dialysis membrane (Cellotube ®, fractionation molecular weight 8,000, a product of Union Carbide Co.).

The dialyzate was cast and dried under reduced pressure to obtain a black precursor polymer film having a thickness of 14 micrometers. This film was cut into 2 cm (length)×1 cm (width) and immersed in an acetone-water mixed solvent containing 12% by weight of water and slowly stretched to 1.8 times the length before immersion. The stretched film was freed of the acetone-water mixed solvent and dried in a nitrogen stream. The film was subjected simultaneously to heat treatment and stretching to 1.3 times, at 100° to 200° C. in a nitrogen atmosphere in a horizontal tubular furnace to obtain a black poly(2,5-furandiyl vinylene) film uniaxially stretched to 2.3 times. The film had a thickness of about 9 micrometers.

The film was subjected to gas phase doping at room temperature according to an ordinary method using iodine as an electron acceptor. The film showed a conductivity of $1.8 \times 10^{-1}$ S/cm.

EXAMPLE 8

3.9 g of 2,5-thienylene-bis(methylenedimethylsulfonium bromide) was dissolved in 50 ml of a deionized water-methanol mixed solvent (1:1 by volume). Thereto was dropwise added 50 ml of a water-methanol solution containing 0.4 g of NaOH, at −30° C. in 30 minutes. The mixture was stirred for 30 minutes at −30° C. The mixture was then heated to 0° C. and a reaction was effected at 0° C. for 10 hours, whereby a precipitate appeared.

The reaction mixture containing the precipitate was subjected to dialysis against a water-methanol mixed solvent (1:1 by volume) at 0° C. for 10 hours using a dialysis membrane (Cellotube ®, fractionation molecular weight 8,000, a product of Union Carbide Co.) to remove soluble low-molecular substances and impurities. Then, the precipitate was collected by solid-liquid separation. The precipitate was insoluble in water but soluble in organic solvents.

The polymer was measured for H-NMR spectrum and $^{13}$C-NMR spectrum using a deuterated dimethyl sulfoxide as a solvent, in which a signal of methoxy group was observed. This indicates that the precursor polymer obtained had a methoxy group as a side chain.

The above precipitate was dissolved in dimethylacetamide, cast and dried at room temperature in a nitrogen stream to obtain an yellow precursor polymer film having a thickness of 20 micrometers. The film was cut into 5 cm (length)×3 cm (width) and immersed in a water-dimethylacetamide mixed solvent containing 40% by weight of dimethylacetamide and slowly stretched to 4.7 times the length before immersion. The stretched film was freed of the water-dimethylacetamide mixed solvent and dried in a nitrogen stream. The resulting film was subjected simultaneously to heat treatment and stretching to 1.1 times, at 100° to 300° C. in a nitrogen atmosphere in a horizontal tubular furnace to obtain a poly(2,5-thienylene vinylene) film uniaxially stretched to 5.2 times, having a black color and a metallic luster. It had a thickness of about 10 micrometers.

The film was subjected to gas phase doping at room temperature according to an ordinary method using iodine. The film showed a conductivity of 2,550 S/cm in 18 hours. The film after doping was further measured for conductivities in a stretching direction and a direction perpendicular thereto, in which the anisotropy of conductivity was 35 or above.

EXAMPLE 9

3.9 g of 2,5-thienylene-bis(methylenedimethylsulfonium bromide) was dissolved in 200 ml of a deionized water-ethanol mixed solvent (1:1 by volume). Thereto was dropwise added a mixed solution consisting of 20 ml of 1N NaOH and 80 ml of ethanol at −30° C. in 30 minutes. The resulting mixture was stirred for 30 minutes at −30° C.

The reaction mixture was subjected to dialysis against a water-ethanol mixed solvent (1:1 by volume) at 5° C. for 1 day using a dialysis membrane (Cellotube ®, fractionation molecular weight 8,000, a product of Union Carbide Co.), whereby a precipitate appeared. The precipitate was collected by solid-liquid separation. The precipitate was insoluble in water but soluble in organic solvents. The polymer was measured for H-NMR spectrum and $^{13}$C-NMR spectrum using a deuterated dimethyl sulfoxide as a solvent, in which a signal of ethoxy group was observed. It indicated that the precursor polymer obtained had an ethoxy group as a side chain. Thus, the alkoxy group of the polymer differed by the type of the alcohol used in polymerization. Therefore, it is presumed that the alcohol reacted with the sulfonium salt.

The above precipitate was dissolved in dimethylformamide, cast and dried at room temperature in a nitrogen current to obtain an yellow precursor polymer film having a thickness of 21 micrometers. The precursor polymer film was cut into 5 cm (length)×3 cm (width) and immersed in a water-dimethylformamide mixed solvent containing 30% by weight of dimethylformamide and slowly stretched to 3.5 times the length before immersion. The stretched film was freed of the water-dimethylformamide mixed solution and dried in a nitrogen stream. The resulting film was subjected simultaneously to heat treatment and stretching to 1.6 times, at 100° C. to 300° C. in a nitrogen atmosphere in a horizontal tubular furnace to obtain a poly(2,5-thienylene vinylene) film uniaxially stretched to 5.6 times, having a black color and a metallic luster. It had a thickness of about 8 micrometers.

The film was subjected to gas phase doping at room temperature according to an ordinary method using iodine. The film showed a conductivity of 2,630 S/cm in 20 hours. The film was further measured for anisotropy of conductivity according to the Montgomery method, in which an anisotropy of 40 or above was seen. Thus, an improvement in conductivity in stretching direction was recognized.

What is claimed is:

1. A process for producing a stretched film or fiber of a conjugated polymer, which comprises subjecting a precursor polymer to stretching in the swollen state at a temperature of 0° to 100° C., said precursor polymer having a repeating unit represented by the general formula

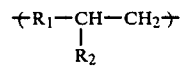

(wherein
R$_1$ is
(a) an aromatic hydrocarbon of 6 to 14 carbon atoms, (b) an aromatic hydrocarbon of 6 to 14 carbon atoms nuclear-substituted with a hydrocarbon of 1 to 10 carbon atoms, an alkoxy of 1 to 10 carbon atoms or a halogen,
(c) a heterocyclic aromatic group having 4 to 13 carbon atoms or
(d) a heterocyclic aromatic group having 4 to 13 carbon atoms nuclear-substituted with a hydrocarbon of 1 to 10 carbon atoms, an alkoxy group of 1 to 10 carbon atoms or a halogen group;

$R_2$ is an alkoxy group of 1 to 10 carbon atoms, a hydroxy group or a group represented by the formula

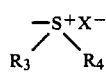

(wherein $R_3$ and $R_4$ are each a hydrocarbon group of 1 to 10 carbon atoms and $X^-$ is a counter ion) and then subjecting the stretched precursor polymer to heating at a temperature of 100° to 400° C. thereby to obtain the conjugated polymer by eliminating the $R_2$ group.

2. A process according to claim 1, wherein the $R_1$ group is a member selected from the group consisting of p-phenylene, 2,5-dimethoxy-p-phenylene, 2,5-diethoxy-p-phenylene, 2,5-dimethyl-p-phenylene, 2,5-dichloro-p-phenylene, 2,5-dibromo-p-phenylene, 2,6-naphthalenediyl, 2,5-thienylene, 3-methyl-2,5-thienylene, 3-methoxy-2,5-thienylene and 2,5-furandiyl.

3. A process according to claim 1, wherein the $R_2$ group is an alkoxy group of 1 to 10 carbon atoms or a hydroxyl group and the $R_1$ group is 2,5-thienylene, 3-methyl-2,5-thienylene or 3-methoxy-2,5-thienylene.

* * * * *